(12) United States Patent
Hinckley et al.

(10) Patent No.: US 7,302,280 B2
(45) Date of Patent: Nov. 27, 2007

(54) MOBILE PHONE OPERATION BASED UPON CONTEXT SENSING

(75) Inventors: Kenneth P. Hinckley, Redmond, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 10/162,487

(22) Filed: Jun. 3, 2002

(65) Prior Publication Data

US 2002/0167488 A1    Nov. 14, 2002

Related U.S. Application Data

(63) Continuation-in-part of application No. 09/875,477, filed on Jun. 6, 2001.

(60) Provisional application No. 60/218,748, filed on Jul. 17, 2000.

(51) Int. Cl.
*H04B 1/38* (2006.01)
*H04M 1/00* (2006.01)

(52) U.S. Cl. .................................... 455/567

(58) Field of Classification Search ............ 455/567, 455/564, 401, 404.2, 575.3
See application file for complete search history.

(56) References Cited

U.S. PATENT DOCUMENTS

| | | | | |
|---|---|---|---|---|
| 4,504,701 A | * | 3/1985 | Lucchesi | ............... 379/373.02 |
| 5,329,577 A | * | 7/1994 | Norimatsu | ............ 455/567 |
| 5,337,353 A | * | 8/1994 | Boie et al. | ............. 379/433.01 |
| 5,481,595 A | * | 1/1996 | Ohashi et al. | ............ 379/88.27 |
| 5,602,566 A | | 2/1997 | Motosyuku et al. | ......... 345/123 |
| 5,657,372 A | * | 8/1997 | Ahlberg et al. | .......... 455/414.1 |
| 5,661,632 A | | 8/1997 | Register | ...................... 361/683 |
| 5,689,665 A | | 11/1997 | Mitsui et al. | ................ 395/342 |
| 5,705,997 A | | 1/1998 | Park | ...................... 340/825.49 |
| 5,712,911 A | * | 1/1998 | Her | ........................ 379/388.01 |
| 5,714,997 A | | 2/1998 | Anderson | ..................... 348/39 |
| 5,761,071 A | | 6/1998 | Bernstein et al. | ....... 364/479.07 |
| 5,860,016 A | | 1/1999 | Nookala et al. | ........ 395/750.06 |
| 5,910,882 A | | 6/1999 | Burrell | ......................... 361/681 |
| 5,924,046 A | * | 7/1999 | Martensson | .................. 455/567 |
| 5,963,952 A | | 10/1999 | Smith | .......................... 707/102 |
| 5,995,852 A | * | 11/1999 | Yasuda et al. | ............... 455/567 |

(Continued)

FOREIGN PATENT DOCUMENTS

JP    8-292826    11/1996

(Continued)

OTHER PUBLICATIONS

Hinckley et al., Sensing Techniques for Mobile Interaction, CHI Letters vol. 2,2; Copyright 2000 ACM 1-58113-212-3, pp. 91-100.*

(Continued)

*Primary Examiner*—William Trost
*Assistant Examiner*—Marivelisse Santiago-Cordero
(74) *Attorney, Agent, or Firm*—Westman, Champlin & Kelly, P.A.

(57) ABSTRACT

A mobile device is provided that includes at least one sensor that provides contextual information to the device. When the mobile device receives an incoming message, or notification, the device responds thereto based at least in part upon the contextual information.

1 Claim, 4 Drawing Sheets

U.S. PATENT DOCUMENTS

| | | | | |
|---|---|---|---|---|
| 6,137,468 | A | 10/2000 | Martinez et al. | 345/126 |
| 6,201,554 | B1* | 3/2001 | Lands | 345/169 |
| 6,215,993 | B1* | 4/2001 | Ulveland | 455/415 |
| 6,216,016 | B1* | 4/2001 | Cronin | 455/567 |
| 6,216,106 | B1* | 4/2001 | John | 704/270 |
| 6,246,862 | B1* | 6/2001 | Grivas et al. | 455/566 |
| 6,259,787 | B1* | 7/2001 | Schulze | 379/352 |
| 6,288,704 | B1 | 9/2001 | Flack et al. | 345/158 |
| 6,292,674 | B1* | 9/2001 | Davis | 455/550.1 |
| 6,304,765 | B1* | 10/2001 | Cosgrove et al. | 455/575.3 |
| 6,310,955 | B1* | 10/2001 | Reeves | 379/424 |
| 6,374,145 | B1 | 4/2002 | Lignoul | 700/17 |
| 6,381,540 | B1* | 4/2002 | Beason et al. | 701/213 |
| 6,408,187 | B1* | 6/2002 | Merriam | 455/458 |
| 6,426,736 | B1* | 7/2002 | Ishihara | 455/566 |
| 6,449,363 | B1* | 9/2002 | Kielsnia | 379/420.01 |
| 6,466,198 | B1 | 10/2002 | Feinstein | 345/158 |
| 6,509,907 | B1* | 1/2003 | Kuwabara | 345/684 |
| 6,516,202 | B1* | 2/2003 | Hawkins et al. | 455/556.2 |
| 6,532,447 | B1* | 3/2003 | Christensson | 704/275 |
| 6,542,436 | B1* | 4/2003 | Myllyla | 455/569.1 |
| 6,560,466 | B1* | 5/2003 | Skorko | 455/567 |
| 6,567,068 | B2 | 5/2003 | Rekimoto | 345/156 |
| 6,567,101 | B1 | 5/2003 | Thomas | 345/649 |
| 6,573,883 | B1 | 6/2003 | Barlett | 345/156 |
| 6,597,384 | B1 | 7/2003 | Harrison | 345/204 |
| 6,621,508 | B1 | 9/2003 | Shiraishi et al. | 715/810 |
| 6,621,800 | B1* | 9/2003 | Klein | 370/282 |
| 6,624,824 | B1 | 9/2003 | Tognazzini et al. | 345/684 |
| 6,631,192 | B1* | 10/2003 | Fukiharu | 379/433.07 |
| 6,658,272 | B1 | 12/2003 | Lenchik et al. | 345/164 |
| 6,822,683 | B1* | 11/2004 | Torikai | 348/333.13 |
| 6,931,592 | B1 | 8/2005 | Ramaley et al. | 715/530 |
| 6,970,182 | B1 | 11/2005 | Schultz et al. | 348/86 |
| 2001/0044318 | A1* | 11/2001 | Mantyjarvi et al. | 455/550 |
| 2002/0140675 | A1 | 10/2002 | Ali et al. | 345/158 |
| 2003/0055655 | A1* | 3/2003 | Suominen | 704/276 |
| 2003/0104800 | A1* | 6/2003 | Zak | 455/404 |
| 2003/0176205 | A1* | 9/2003 | Oota et al. | 455/567 |

FOREIGN PATENT DOCUMENTS

| | | | |
|---|---|---|---|
| JP | 2000124970 A | * | 4/2000 |
| JP | 2001094636 A | * | 4/2001 |
| WO | WO 98/14863 | | 4/1998 |
| WO | WO 99/22338 | | 6/1999 |

OTHER PUBLICATIONS

Bartlett, J.F., "Rock'n'Scroll Is Here to Stay," IEEE Computer Graphics and Applications, pp. 40-45, (May/Jun. 2000).

Harrison, Beverly L. et al, "Squeeze Me, Hold Me, Tilt Me! An Exploration of Manipulative User Interfaces," pp. 17-24 (Apr. 18-23, 1998), CHU '98.

Rekimoto, Jun, "Tilting Operations for Small Screen Interfaces (Tech Note)," pp. 167-168, UIST '96.

Schmidt, Albrect, "Implicit Human Computer Interaction Through Context," pp. 1-5, 2nd Workshop on Human Computer Interaction with Mobile Devices, 1999.

Schmidt, Albrect et al., "There Is More to Context Than Location," Environment Sensing Technologies for Adaptive Mobile User Interfaces, 5 pages, IMC '98.

Small, David et al., "Design of Spatially Aware Graspable Displays," Extended Abstracts of CHI '97, pp. 1-2 (Mar. 22-27, 1997).

Schmidt, Albrecht et al., "Advanced Interaction in Context," 13 pages, HUC '00.

One page (19) from Technology Review dated Mar. 2002.

Office Action received in U.S. Appl. No. 09/875,477.

Office Action (Apr. 30, 2004 and Oct. 6, 2003) and Response (May 27, 2005; Dec. 15, 2004; Sep. 27, 2004; Jun. 30, 2004; Feb. 6, 2004) received in U.S. Appl. No. 09/875,477.

RotoView™ By Innoventions, How It Works, no date listed.

RotoView™ By Innoventions, The Intuitive Display Navigation Solution for Hand Held Devices, no date listed.

RotoView™ By Innoventions, Features and Specifications, no date listed.

RotoView™ By Innoventions, The Intuitive Display Navigation Solution for Hand Held Devices, no date listed.

Innoventions' RotoView™, The Intuitive Display Navigation Solution for Hand Held Devices, Background and Problem Definition, no date listed.

Office Action (Jul. 22, 2005) and Response (Sep. 27, 2005) from U.S. Appl. No. 10/294,286, filed Nov. 14, 2002.

Office Action (Jan. 9, 2006) from U.S. Appl. No. 09/875,477, filed Jun. 6, 2001.

Office Action (Nov. 2, 2005) and copy of Response (Dec. 9, 2005) from U.S. Appl. No. 10/294,286, filed Nov. 14, 2002.

Office Action (Jun. 20, 2006) from U.S. Appl. No. 09/875,477, filed Jun. 6, 2001.

Response (Jul. 6, 2006) from U.S. Appl. No. 10/294,286, filed Nov. 14, 2002.

Office Action (Mar. 14, 2005) and Response (Apr. 6, 2006) from U.S. Appl. No. 09/875,477, filed Jun. 6, 2001.

Office Action (Apr. 6, 2006) and Response (Oct. 11, 2005 and Feb. 2, 2006) from U.S. Appl. No. 10/294,286, filed Nov. 14, 2002.

* cited by examiner

MOBILE PHONE OPERATION BASED UPON CONTEXT SENSING

REFERENCE TO RELATED APPLICATION

This application is a Continuation-In-Part Application of U.S. patent application Ser. No. 09/875,477, filed Jun. 6, 2001, which claims priority from a U.S. Provisional application having Ser. No. 60/218,748, filed on Jul. 17, 2000 and entitled "METHOD AND APPARATUS USING MULTIPLE SENSORS IN A MOBILE DEVICE."

BACKGROUND OF THE INVENTION

The present invention relates to mobile devices, and more particularly to mobile phones.

Mobile phones have become ubiquitous communication devices, but they often employ naive alerting policies that can transform them into nuisances. In particular, mobile phones are typically unaware of how they are being used. Thus, they may act in a way that is disruptive of others, and/or embarrassing to the user. While many mobile phones do support profiles that allow the user to manually set an appropriate response for different contexts, the user must still remember to switch to the correct profile when an old profile is no longer relevant, or even appropriate for future contexts. For example, a mobile device user attending a function in a quiet auditorium might forget to select the "silent/meeting" mode on the device, only to be reminded of this fact when the device receives an incoming call and announces itself to the entire auditorium. Conversely, a mobile device erroneously left in a "meeting" profile may lead to missed calls in a subsequent noisy outdoor context.

In addition to the current need to ameliorate the "nuisance" of mobile phones, there is an additional need to allow such devices to interact with users in a more intuitive fashion. This allows users to take advantage of more-sophisticated device functions with relative ease. Mobile phones that can recognize, and appropriately respond to the intuitive actions that users customarily provide would simplify operation and facilitate user acceptance.

SUMMARY OF THE INVENTION

A mobile device is provided that includes at least one sensor that provides contextual information to the device. When the mobile device receives an incoming message, or notification, the device responds thereto based at least in part upon the contextual information.

DETAILED DESCRIPTION OF ILLUSTRATIVE EMBODIMENTS

Embodiments of the present invention will be described hereafter based upon a generic mobile device. It is contemplated that such description encompasses both mobile computing devices, such as handheld computers, as well as mobile phones and combinations thereof.

Figure 1:
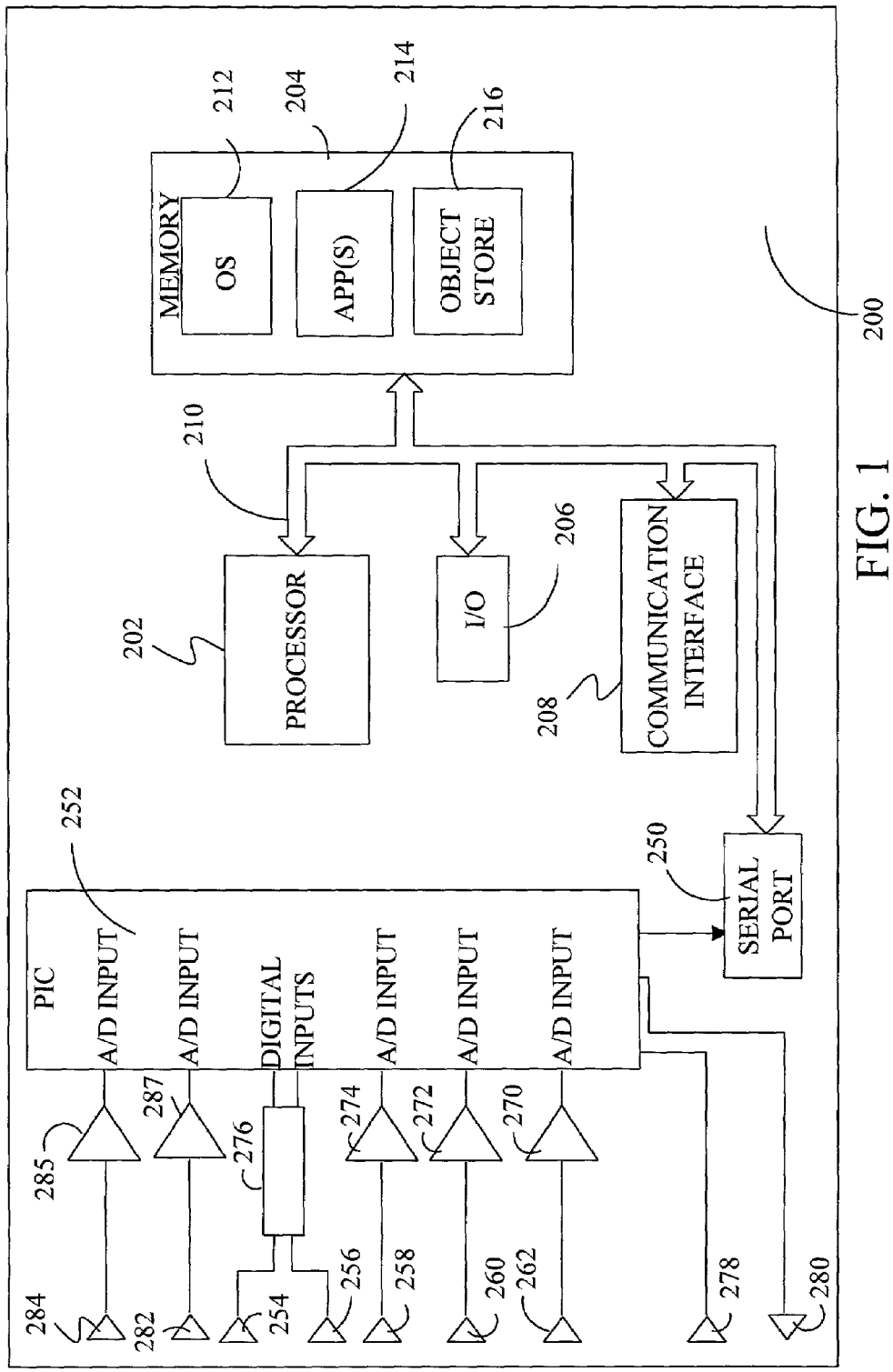
FIG. 1 is a block diagram of an environment in which embodiments of the present invention may be practiced.

FIG. 1 is a block diagram of a mobile device 200, which is an exemplary environment for embodiments of the present invention. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as a non-volatile electronic memory such as a random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214, and an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can optionally be directly connected to a computer to exchange data therewith. In such cases, communication interface 208 can include an infrared transceiver or a serial or parallel communication connection, all of which are capable of transmitting streaming information.

Input/output components 206 include a variety of input devices that have previously been found on mobile devices such as a touch-sensitive screen, buttons, rollers, and a microphone as well as a variety of output devices including an audio generator, a vibrating device, and a display. The devices listed above are by way of example and need not all be present on mobile device 200.

Mobile device 200 also includes additional input devices in accordance with embodiments of the present invention. Under one embodiment, these input devices are connected: to the mobile device through a separate serial port 250 and a peripheral interface controller (PIC) microprocessor 252. In other embodiments, these additional devices are connected to processor 202 through communication interface 208 and PIC microprocessor 252 or through PIC microprocessor 252 directly. Under one embodiment, a microchip 16C73A peripheral interface controller is used as the PIC microprocessor. In still further embodiments, PIC microprocessor 252 is not present and the input devices are connected to processor 202 through various ports such as serial port 250 or through communication interface 208.

Under the embodiment illustrated in FIG. 1, the additional input devices include two touch sensors 254 and 256, a forward/back tilt sensor 258, a left/right tilt sensor 260, proximity sensor(s) 262 consisting of a capacitive sensor and/or a range sensing infrared sensor/emitter pair, an optional temperature sensor 284, and a gravity switch 282. The sensing signals from the proximity sensor(s) 262, left/right tilt sensor 260, forward/back tilt sensor 258, and gravity switch 282 are provided through respective amplifiers 270, 272, 274 and 287 to analog inputs of PIC microprocessor 252. These analog inputs are connected to analog-to-digital converters within PIC microprocessor 252. In other embodiments, the sensors provide a digital output and thus are connected to digital inputs on the microprocessor. All of sensors 254, 258, and 262 can be considered contextual sensors in that they sense parameters related to the environment of device 200.

In the embodiment of FIG. 1, touch sensors 254 and 256 are provided to a separate peripheral interface controller microprocessor 276 which converts the touch signals into digital values and provides the digital values to PIC microprocessor 252. In other embodiments, touch sensors 254 and 256 are connected directly to analog or digital inputs in PIC microprocessor 252 instead of being connected to PIC 276 or are connected to processor 202.

Under one embodiment, PIC microprocessor 252 continuously samples the sensors and transmits packets representing the state of these sensors at a rate of approximately 400 samples per second through serial port 250 to processor 202 and optionally to an appropriate external entity or notification platform through interface 208. In some embodiments, samples are reported at lower speeds to conserve power and processing resources. Some sensors may be reported at different sampling rates than others (e.g. tilt may be updated more frequently than touch).

Figure 2:
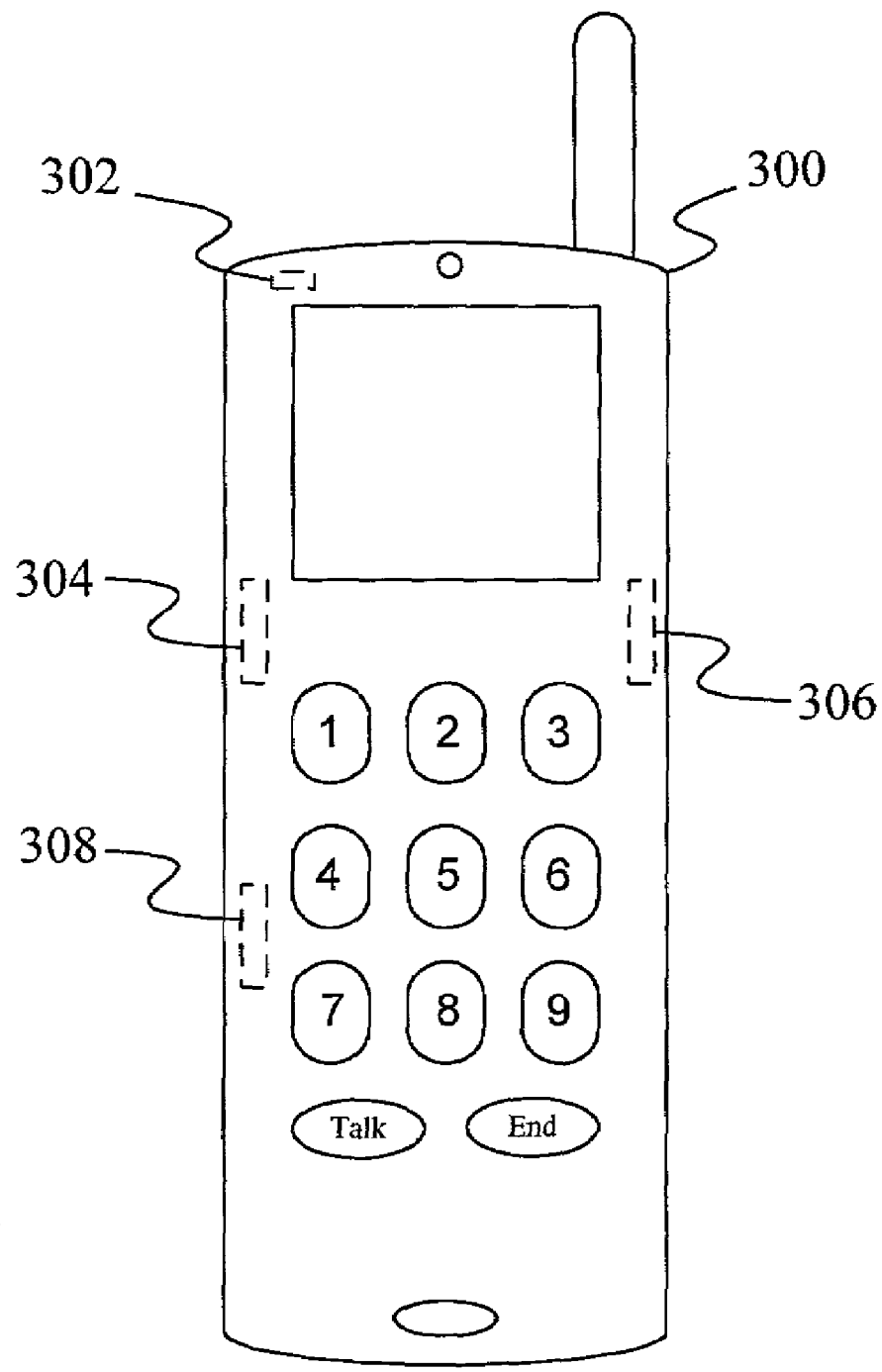
FIG. 2 is a front view of one type of mobile device in which embodiments of the present invention can be practiced.

Left/right tilt sensor 260 and forward/back tilt sensor 258 are shown as a single dotted element 308 in FIG. 2 representing a two-dimensional tilt sensor. These tilt sensors are embedded within the casing of mobile device 200 and in one embodiment are located at a point about which users typically pivot mobile device 200 when tilting the device. Note that the tilt sensor's position within the mobile device is unimportant as it senses only the angle of its physical attitude with respect to gravity. The sensor's angular position within the device is important.

Under one embodiment, an Analog Devices ADXL05 two-axis linear accelerometer is used for tilt sensors 258 and 260. The sensor also responds to linear accelerations, such as those resulting from shaking the device. Typically, the tilt sensor has a response curve both in the forward/back direction and left/right direction with the form:

$$\text{Angle} = \sin^{-1}\left(\frac{T - T_c}{k}\right) \quad \text{EQ. 1}$$

where T is the tilt sensor value, $T_c$ is the sensor value at 0° tilt, and k is a gain parameter. In embodiments where the sensor cannot detect the sign of the gravity vector, it is unable to determine if the user is holding the device with the display facing up or down. Gravity switch 282 of FIG. 1 is thus provided in some embodiments to indicate whether the display is facing the ground. In other embodiments, a three-axis accelerometer is used to provide the sign of the gravity vector.

FIG. 2 is a front view of mobile device 300 provided with contextual sensors in accordance with an embodiment of the present invention. Mobile device 300 includes tilt sensor 308, which can be a single tilt sensor, or a combination of tilt sensors disposed to provide an indication of tilt in multiple axes. Proximity sensor 302 is preferably positioned within or upon device 300, such that sensor 302 can provide an indication of proximity between device 300 and a user. In some embodiments, sensor 302 can include an infrared transceiver, such that the indication is based on infrared light reflecting from the user. In other embodiments, however, sensor 302 is a capacitive sensor and provides an indication of the electric field around device 300, which field is detectably changed when a user is proximate device 300. In some embodiments, both sensor types are available, as they have different response characteristics and failure modes (e.g., bright sunlight affects an infrared sensor but not a capacitance sensor; but in most situations the infrared sensor can detect the proximity of objects at a longer distance than the capacitance sensor).

Device 300 also includes touch sensors 304 and 306, which can be identical to touch sensors 254, 256 described above. Sensors 304 and 306 provide an indication of whether device 300 is being touched. Device 300 can also include additional optional sensors such as a temperature sensor, an ambient light sensor, and any other sensor that can provide useful contextual information.

Figure 3:
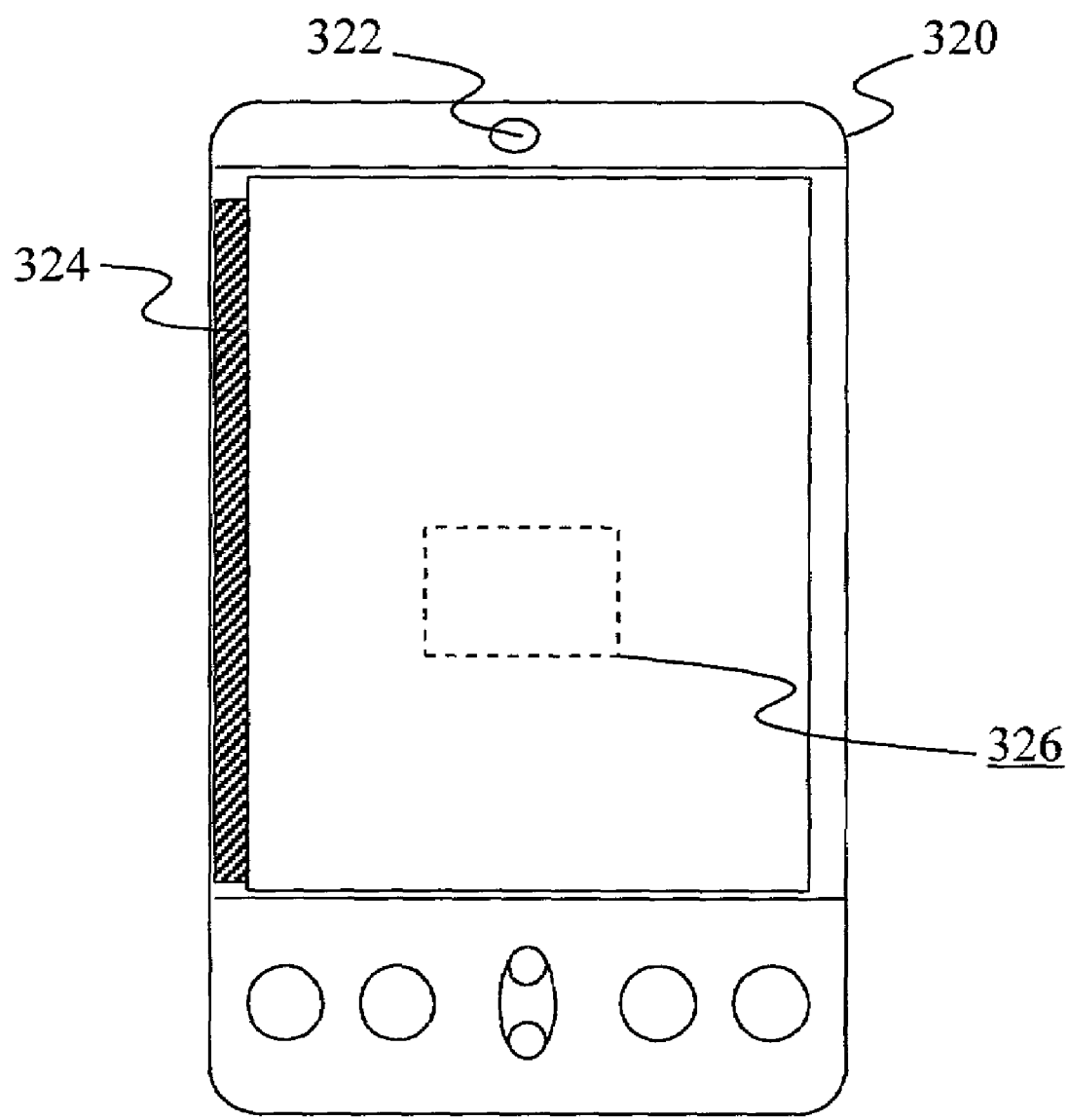
FIG. 3 is a front view of another type of mobile device in which embodiments of the present invention can be practiced.

FIG. 3 is a front view of mobile device 320 provided with contextual sensors in accordance with another embodiment of the present invention. Mobile device 320 includes tilt sensor 326, touch sensor 324, and proximity sensor 322. Sensors 322, 326 and 324 can be identical to their respective counterparts described with respect to FIG. 2. Further, device 320 can also include additional sensors such as a light sensor and/or a temperature sensor.

Figure 4:
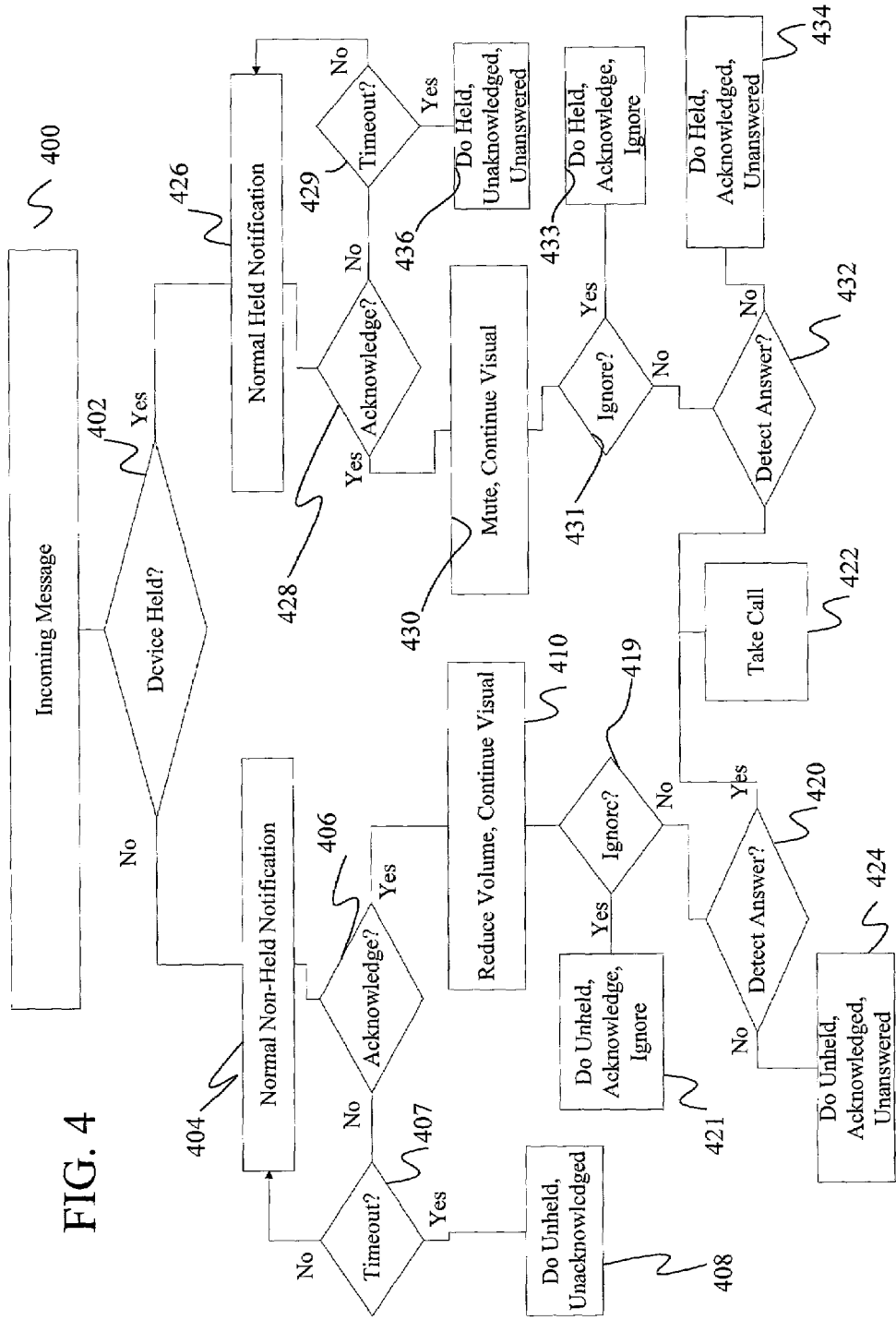
FIG. 4 is a flow diagram of a method for handling an incoming call in accordance with an embodiment of the present invention.

Operation of the mobile devices described above will be described with respect to the flow diagram illustrated in FIG. 4, which can be implemented as a program running within any of the devices described above. At block 400, an incoming message, typically a call, is detected. When an incoming call is detected, the mobile device determines if it is currently held, as indicated at block 402. In one embodiment, the detection is performed at block 402, using signals from the touch sensor(s) to determine if the mobile device is being touched. However, it is contemplated that detecting whether the mobile device is being held can include more sophisticated analyses, such as including tilt and/or proximity information. If the mobile device is being held, then control passes to block 404, where normal, non-held notification begins.

Typically, the notification provided at block 404 includes full-volume audio notification, as well as visual indication. Moreover, if device 200 is equipped with a vibration generator, then notification at block 404 can include vibration as well.

At block 406, the mobile device determines whether the call is acknowledged by the user. When the mobile device is not held, acknowledgement is accomplished by the user simply touching the device, as registered by one or more touch sensors; or by picking up the phone, in a manner indicative of viewing the phone display, as registered by a combination of the touch sensors and the tilt sensor and/or the gravity switch. If the call is not acknowledged, the mobile device determines if the notification has exceeded a selected Timeout, as indicated at block 407. If notification has not timed out, control returns to block 404, however, if notification has timed out, control passes to block 408 where the call is treated as an unanswered, and unacknowledged call on a non-held device. This treatment may include routing the call to a voice-messaging system or forwarding the call to an alternate device.

If during block 406, device 200 determines that the user acknowledged the call by touching or picking up the mobile device, then control passes to block 410. Because the user has acknowledged the call, the audio notification can be made less obtrusive. Thus, at step 410 the mobile device switches to a more non-obtrusive mode wherein the visual indication of the pending call is maintained, while the audio volume is substantially reduced. It is possible to mute the notification in this state as well, however, simply reducing volume is believed to be a better response since muting the notification can cause the user to believe that he or she has hung up on the caller by mistake, or that the caller abandoned the call. After the notification has been modified based on the acknowledgement, the mobile device determines if the user actually indicates a desire to ignore or answer the call at steps 419 and 420, respectively.

In most embodiments, the user actively ignores a call by returning the mobile device to a position or state that is less-consonant with answering the call than a position or state detected during or after acknowledgement. Thus, the user's desire to ignore a call can be determined by touch and/or tilt sensors. For example, if the user has acknowledged the call by rotating the device to a position where the screen can be viewed, rotating the device back would indicate that the user wishes to ignore the call. Once the mobile device determines that the user wishes to ignore the call, at step 419, the call is processed as an unheld, acknowledged but ignored call at step 421. This processing can include immediately ceasing all notifications including, in some situations, visual notifications.

To determine if the user wants to actively answer a call, the mobile device can either detect that the user pressed a "Talk" button to accept the call, or can detect that the user is making a gesture with the mobile device that is consonant with wishing to take the call. Generally, such gesturing includes positioning device 200 near the user's ear at an appropriate tilt angle. Thus, device 200 will sense the associated touch, tilt, and proximity via sensors 258, 260 and 262. Additionally, sensing a microphone signal for the user's voice, and/or the word "hello," for example, will add robustness to answer detection. If device 200, detects a user's desire to answer, control passes to block 422 where the call is passed on to the user.

However, if no such desire is detected, then control passes to block 424, where the call is treated as acknowledged, but unanswered. This can include muting the notification without notifying the caller, and/or routing the call directly to a voice-messaging system. This may also include displaying options on the screen for the user to choose what to do with the call (ignore/hang up, send to voice mail, put on hold, send a short text macro as a response such as "I am busy, call back later", etc.)

If the mobile device is being held when a call arrives at step 402, the device enters a notification mode consonant with being held (block 426 ). This can include the same initial notification as provided at block 404. However, in some embodiments where the mobile device is equipped with a vibration generator, notification at block 426 can be simple vibration and visual notification, since vibration is bound to get the user's attention when the mobile device is held. During notification indicated by block 426, block 428 determines if the user has acknowledged the call. Since the user's touch generated the "Held" condition, touch is generally not used to sense acknowledgement when device 200 is held. Instead, at block 428, the mobile device senses tilt to determine if the user has moved the mobile device into a position consonant with viewing the device.

If the mobile device does not detect acknowledgement during block 428, control passes to block 429 where the mobile device determines whether an allotted time period for notification has expired. If the time period has not expired, the notification continues at step 426. If the time period has expired, the call is handled as being held but not acknowledged at step 436. This generally indicates that the user is holding the phone but is too busy to take the call. As a result, the call is either directed to a voice-messaging system after a period of time, or is abandoned by the caller.

If acknowledgement is detected at step 428, control passes to block 430, where any audio volume is muted and any vibration notification is preferably discontinued, since the user has acknowledged the call and further audio signals and vibration might be a nuisance. At block 430, however, the visual notification is preferably continued so that the user knows he or she can still answer the call if that is desired.

From block 430, control passes to block 431 and 432, where the mobile device determines if the user wishes to actively ignore or answer the call in a manner similar to that described above with respect to blocks 419 and 420. If the user wishes to ignore the call, control passes to block 433 where it is handled as a held, acknowledged, but ignored call. If the user wishes to take the call, control passes to block 422, but if the user does not wish to take the call, control passes to block 434. At block 434, the call is treated as acknowledged, but unanswered while the device is held and is therefore routed to a voice-messaging system or allowed to go abandoned.

Treatment of unanswered calls at blocks 408, 421, 424, 433, 434, and 436 can be identical, i.e. passing the call to a messaging system. However, since each of blocks 408, 421, 424, 433, 434, and 436 represents a different condition of the mobile device and/or user interaction, the incoming call may be dealt with differently based upon the acquired contextual information. For example, additional information could be provided to the caller, such as, "User has acknowledged your call but cannot take it at the moment" to potentially let the caller better interact with the user.

Additionally, in situations where device 200 is not held, further detection can be performed to determine if other contexts are applicable. For example, if device 200 is not held, but tilt sensor 308 indicates that device 200 is positioned upon a flat perpendicular surface, such as a table, the notification may be further adapted such that only audio and visual cues are provided, instead of also engaging a vibration generator. This feature can help ameliorate the situation where a device set on silent/vibrate mode buzzes on the table upon receipt of an incoming call.

Together, the device and method described above use naturally occurring gestures prevalent in mobile device use, particularly mobile phones, to help ensure that the device quiets, and then mutes, as soon as is feasible, thus minimizing potential disruption to others while also being certain that notifications get through if possible.

Thus far, description of embodiments of the present invention has focussed on device 200 operating alone. In reality, a user may have a number of different mobile devices. For example, a single user may have a mobile phone, mobile computing device, digital pager, and/or other suitable devices. Typically, a user will only interact with one such device at a time. Thus, if one mobile device, such as a mobile phone, has current sensor information indicative of it being held, it may communicate data based thereon to other mobile devices, or to a notification manager, such that notifications to the user that would otherwise arrive on a different mobile device, arrive on the held device. A wireless communication standard known as Bluetooth, is one example of wireless communication that facilitates such functions. It is contemplated that each mobile device that acquires contextual information via sensors can provide data indicative of the sensor signals themselves to other devices, or a notification platform. Thus, although a single mobile device may not be able to ascertain sufficient contextual information to assess a user's intention, the aggregated information from multiple such devices may indeed be sufficient.

Incorporating the sensors described above into mobile devices facilitates providing additional features for mobile phones. For example, a number of commercially available mobile phones allow voice-dialing, where the user simply says something like "Call Home." The phone responds by calling the number associated with home. However, the user must generally speak a selected word, or press the Talk button to trigger this functionality. However, users generally pick the phone up before they issue voice commands. Thus, in accordance with an aspect of the present invention, when device 200 registers a touch, and tilt, when no calls are incoming, then device 200 activates the microphone to receive voice-dialing and/or voice recognition.

Another feature of embodiments of the present invention is useful in low-light situations. Device 200 can optionally be provided with a light sensor. In such embodiments, when the sensor detects low light, and device 200 registers a touch, a backlight can turn on allowing the user to interact with device 200. The light can be set to time out if no interaction is registered, but can stay on if touch sensors or tilt sensors register continued interaction. optionally, an ambient light sensor can also be included in device 200 to sense ambient light such that a user's touch during normal levels of ambient light will not activate the display light.

Although the present invention has been described with reference to particular embodiments, workers skilled in the art will recognize that changes may be made in form and detail without departing from the spirit and scope of the invention.

What is claimed is:

1. A mobile device comprising:
a communication interface configured to detect an incoming call;
a processor coupled to the communication interface;
an input/output including a microphone coupled to the communication interface and disposed to receive audible user input;
a touch sensor coupled to the processor;
a tilt sensor coupled to the processor; and
wherein the processor activates the microphone to receive voice recognition when touch and tilt are detected by the touch and tilt sensors respectively, and no incoming call is detected.

* * * * *